(12) United States Patent
Hogan

(10) Patent No.: US 6,532,201 B1
(45) Date of Patent: Mar. 11, 2003

(54) COPY PROTECTION FOR OPTICAL DISCS

(75) Inventor: Josh Hogan, Los Altos, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/542,679

(22) Filed: Apr. 3, 2000

(51) Int. Cl.[7] .................................................. G11B 5/09
(52) U.S. Cl. .................................. 369/53.21; 369/53.36
(58) Field of Search ........................... 369/47.28, 47.3, 369/47.37, 53.15, 53.21, 53.22, 53.29, 53.35, 53.36, 272; 714/54; 380/200, 201, 202, 203

(56) References Cited

U.S. PATENT DOCUMENTS

| | | | |
|---|---|---|---|
| 5,315,567 A | 5/1994 | Fuji et al. | 369/32 |
| 5,377,178 A | 12/1994 | Saito et al. | 369/124 |
| 5,699,434 A | 12/1997 | Hogan | 380/49 |
| 5,761,301 A * | 6/1998 | Oshima et al. | 705/57 |
| 5,809,006 A | 9/1998 | Davis et al. | 369/275.4 |
| 5,832,088 A | 11/1998 | Nakajima et al. | 380/22 |
| 5,852,599 A | 12/1998 | Fuji | 369/275.4 |
| 5,862,123 A | 1/1999 | Horie et al. | 369/275.4 |
| 5,933,411 A | 8/1999 | Inui et al. | 369/275.4 |
| 5,953,297 A | 9/1999 | Maeda et al. | 369/47 |
| 6,285,763 B1 * | 9/2001 | Gotoh et al. | 380/203 |

OTHER PUBLICATIONS

Abramovitch et al; "High Frequency Wobbles: A Write Clock Generation Method for Rewritable DVD That Enables Near Drop–In Capability with DVD–ROMs"; Feb., 2000; Inclusive pp.: 846–854; Japanese Journal of Applied Physics, Part 1 (Regular Papers, Short Notes & Review Papers) vol. 39, No. 2B.

Watanabe et al.; "Examination of the Read/write Characteristics of an MO Signal with a Wobbled Grove Clock"; SPIE vol. 3401; pp. 2–5.

Yoshida et al.; "4.7 Gbyte Re–Writable Disc System Based On DVD–R System"; Nov. 1999; IEEE Transactions on Consumer Electronics, vol. 45, No. 4; pp. 1270–1276.

Bloom, et al; "Copy Protection for DVD Video";Jul. 1999; pp. 1267–1276 of the Proceedings of the IEEE vol. 87, No. 7.

Alan E. Bell; "The dynamic digital disk"; Oct. 1999; pp. 28–35 of the IEEE Spectrum.

Debbie Galante Block; "Rallying the Disc Patrol: Protection Schemes for CD and DVD"; Dec. 1998; EMedia Professionald.

* cited by examiner

Primary Examiner—Thang V. Tran
Assistant Examiner—Kimlien Le
(74) Attorney, Agent, or Firm—Augustus W. Winfield

(57) ABSTRACT

An optical disc has spatial features (notches, bumps, etc.) that intentionally cause read errors if arbitrary data is recorded on the disc in an area where the special features are located. The spatial features are located such that they occur in the center of longer marks or spaces of pre-determined data patterns. This allows pre-determined data patterns to be written and read without a significant number of errors, while arbitrary data patterns will be subject to a significant number of errors, rendering the arbitrary data unreadable. Control Data ECC blocks are partially pre-determined at least in the areas containing decryption keys, while still permitting some arbitrary data to be written in other areas of the Control Data ECC blocks. Therefore, compatibility with existing drives is preserved, without representing a threat of unauthorized copying of stamped discs.

20 Claims, 8 Drawing Sheets

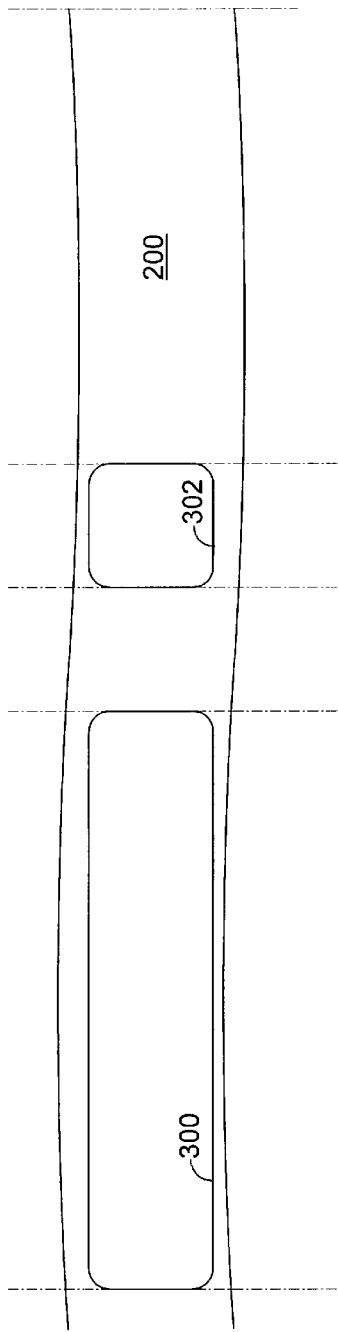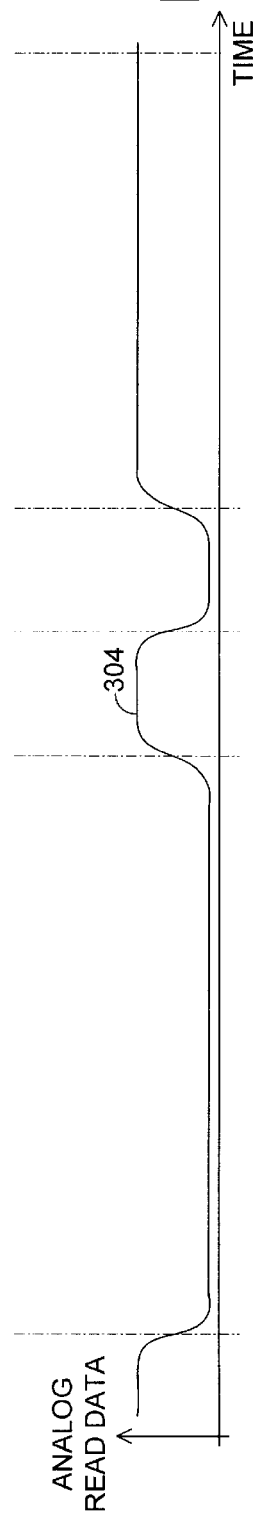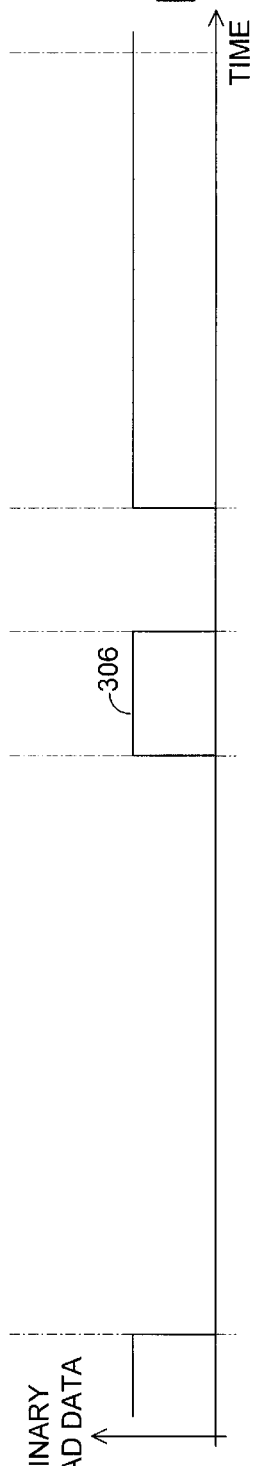

COPY PROTECTION FOR OPTICAL DISCS

CROSS REFERENCE TO RELATED APPLICATIONS

This application is related to Ser. No. 09/541,812, entitled "METHOD FOR ACCURATE POSITIONING OF DATA MARKS AND SPACES ON AN OPTICAL DISC", and Ser. No. 09/542,404, also entitled "METHOD FOR ACCURATE POSITIONING OF DATA MARKS AND SPACES ON AN OPTICAL DISC", both filed on the same day as this application, and both of which are hereby incorporated by reference.

FIELD OF INVENTION

This invention relates generally to optical discs used for data storage, and more specifically to inhibiting unauthorized copying of data from one disc to another.

BACKGROUND OF THE INVENTION

Compact Discs (CD) and Digital Versatile Discs (DVD) exist in a variety of types. For mass distribution of copyrighted material, such as music and video, the discs are typically stamped from a master disc. Some disc types are writable, and can be written only once. Other disc types can be rewritten many times.

One proposed method for copy protection of stamped video media is the Content Scramble System (CSS) developed by Matsushita Electric Industries. In CSS, the video data is selectively scrambled. Descrambling requires decryption keys that are stored on the disc. Licensed drives can retrieve the keys and use the keys to unscramble the data. Keys can be passed only between licensed devices containing special hardware, for example, between a licensed drive and a licensed decoder in a computer. For general background information on CSS and DVD copy protection, see, for example, J. A. Bloom et al., "Copy Protection for DVD Video," *Proceedings of the IEEE*, v87 n7, (Jul. 1, 1999), pp 1267–1276, and Alan E. Bell, "The Dynamic Digital Disk," *IEEE Spectrum*, v36 n10, (October 1999), pp 28–35.

A byte-for-byte copy of an entire DVD disc, including the area containing the decryption keys, could be used to create a copy of a disc that is indistinguishable from the original. Consequently, various roadblocks have been proposed to prevent a recording drive from recording the decryption keys. For example, in one proposed copy protection method, for recordable media, the area where the decryption keys need to be recorded would be pre-embossed, or in the case of write-once media, pre-recorded. A resulting copy would contain all of the scrambled data, but not the decryption keys required to unscramble the data. However, the keys are stored in Control Data blocks in the lead-in area of the disc, and the Control Data blocks contain other essential data that needs to be variable. Preventing all writing into the Control Data blocks limits the usefulness of the disc for legitimate recording of un-protected data. In addition, rewriteable media with pre-stamped lead-in areas may be incompatible with existing DVD-ROM and DVD video players, and may also increase manufacturing costs.

There is a need for a writeable disc medium that physically prevents reading of arbitrary data, with a correctable error rate, written in reserved areas, such as areas reserved for decryption keys, but still allows reading and writing of arbitrary data in non-reserved areas, and allows a combination of some arbitrary data and some pre-determined data in the reserved areas. There is a further need for such a medium that is fully backward compatible with existing drives.

SUMMARY OF THE INVENTION

The spatial structure of a particular area of the disc is modified, so that only limited data can be read, with a correctable error rate, from the particular area. If arbitrary data, such as decryption keys (which effectively appear as pseudo-random data), are written into the particular area, the data in the particular area will be effectively unreadable due to an uncorrectable error rate. However, a combination of some limited arbitrary data and pre-determined data may be written into a block, and may be read with a correctable error rate, enabling an un-protected disc to be written and played. Thus, compatibility with existing drives is preserved, without representing a threat of unauthorized copying of stamped discs.

Spatial features (notches, bumps, etc.) are implemented such that they intentionally distort the analog Read Data signal for any marks or spaces adjacent to the spatial features. When a transition between a mark and a space is not near a spatial feature, the distortion does not affect the resulting binary Read Data signal. In contrast, if a transition between a mark and a space is near a spatial feature, the timing of the resulting binary Read Data signal is affected significantly (sufficient to cause a data error). For calibration, a mark and space sequence may be repeatedly written adjacent to spatial features, while adjusting the timing of the Write Data signal until no data errors occur. From the calibration procedure, it is known when a transition between a mark and a space must be initiated in the Write Data signal in order to place the mark or space at a known spatial location.

When recording data on a disc, data is scrambled (along with error detection codes) and formed into two-dimensional blocks, where error correction codes (ECC) are added for rows and columns of the two-dimensional blocks (called ECC blocks). Data in a specified area (specified rows and columns) of an ECC block may be pre-determined. Spatial features as described above may be formed onto the disc at manufacturing time, so that only the pre-determined data (in scrambled form), and corresponding pre-determined ECC codes, can be written and read with a correctable error rate in the areas reserved for pre-determined data. That is, only the pre-determined data will have marks and spaces properly aligned with (transitions between marks and spaces not near) the spatial features. Arbitrary data in the specified area will have errors due to proximity of transitions between marks and spaces to spatial features, and will likely overwhelm the error-correction capability for the ECC block. The remaining parts of the ECC block may be written with arbitrary data. Accordingly, when pre-determined data is written into the specified area, the remaining part of each Control Data ECC block can contain arbitrary data, and the entire block can be read with a correctable error rate. Conversely, writing user determined (pseudo-random) data in the specified area will cause the entire Control Data ECC block to be uncorrectable, and therefore unreadable. In particular, Control Data ECC blocks may have the area reserved for decryption codes to be at least partially pre-determined, while still permitting some variable data to be written in other areas of the block.

BRIEF DESCRIPTION OF THE DRAWINGS

FIG. 3A is a plan view of a disc with a wobbled groove as in FIG. 2, and further illustrating data marks in the wobbled groove.

FIG. 3B is a waveform of an analog data signal resulting from the mark illustrated in FIG. 3A.

FIG. 3C is a waveform of a binary data signal resulting from the mark illustrated in FIG. 3A.

DETAILED DESCRIPTION OF THE PREFERRED EMBODIMENT OF THE INVENTION

In one aspect of the invention, data marks and spaces are spatially aligned to spatial features on the optical medium. In the following description, drives and media suitable for use with the invention are described, and then example methods are disclosed for spatially aligning data marks and spaces to spatial features. Then data formats are discussed. Finally, example embodiments are disclosed that use spatial features and pre-determined data to implement copy protection.

I. Optical Disc Drives

One rewriteable DVD format specifies a land and groove structure, with the grooves having a sinusoidal radial displacement (called wobble), and for the particular format, groove wobble is used to synchronize a write clock. In general, data is encoded in the timing of transitions between marks and spaces. The particular format specifies that certain marks and spaces must be written within a specified range of spatial positions relative to a spatial zero-crossing of the wobble. In general, the transitions between data marks and spaces are defined by edges of a write clock. Accordingly, a necessary first step in controlling placement precision is an accurate synchronized write clock. However, there are various signal path delays that may vary with time and temperature, and signal path delays that may vary from drive to drive. In addition, the impact of these signal path delays may vary depending on the angular velocity at which the disc is written.

Figure 1:
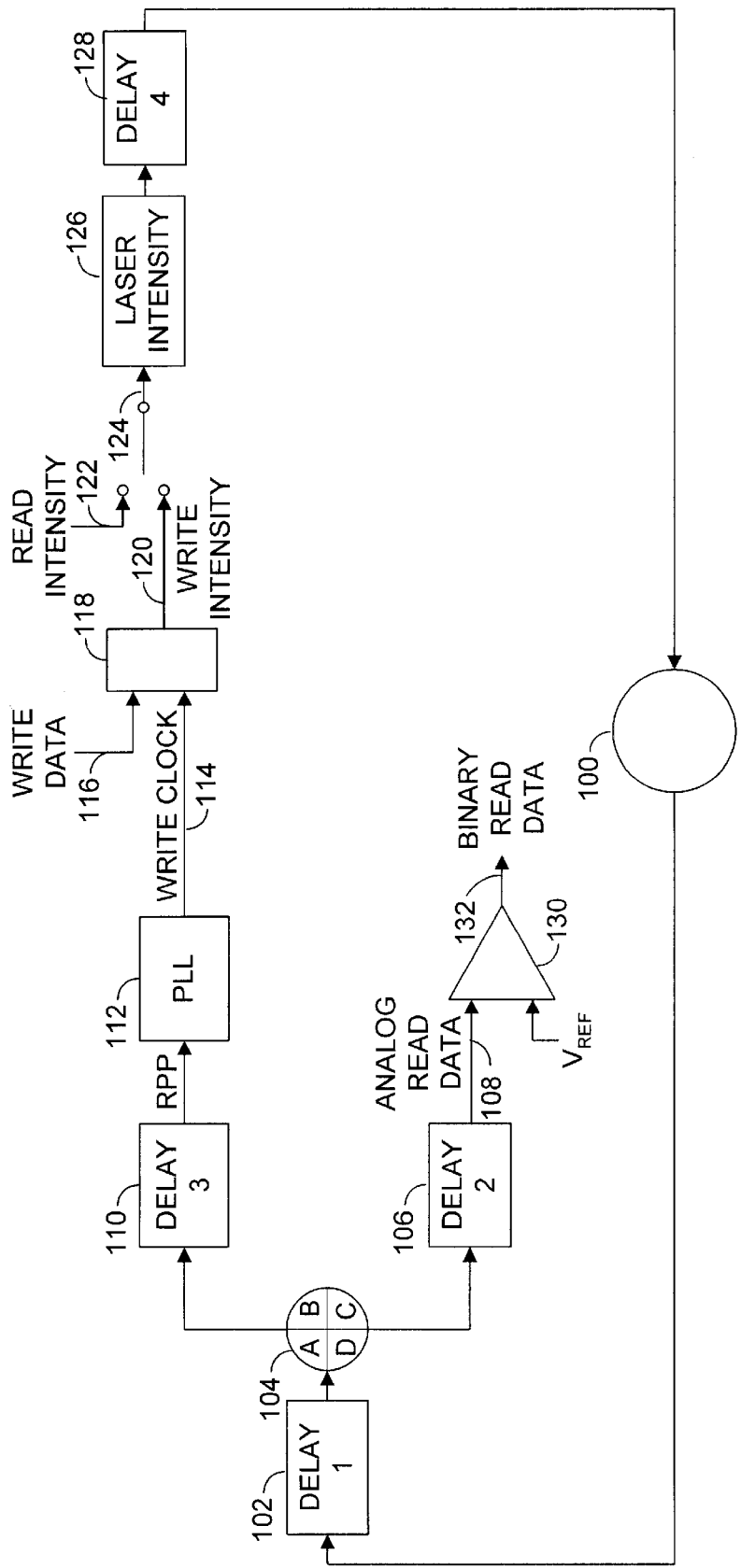
FIG. 1 (prior art) is a block diagram of an example optical disc drive suitable for use with the present invention.

FIG. 1 (prior art) illustrates a representative example disc drive. In many optical disc drives, a single optical detector is used to generate a data signal, a radial position error signal, a focus error signal, and perhaps a wobble signal. FIG. 1 illustrates various lumped path delays for an optical disc drive using one optical detector for multiple functions. In FIG. 1, a light spot 100 is focused onto a data layer of an optical disc. Light reflected from the disc passes through various optical components before being detected by an optical detector 104. In FIG. 1, optical path delays between the disc and the detector 104 are lumped as Delay 1 (102). As depicted in FIG. 1, the optical detector 104 is divided into four sections (A,B,C,D), with each section providing a separate signal. The sum of the four signals (A+B+C+D), with some electronic filtering and processing, is the analog Read Data signal (108). Read Data signal path delays, due to filtering and other electronic processing, are lumped as Delay 2 (106). The analog Read Data signal 108 is received by an analog comparator 130, and compared to a reference voltage. The binary output of the analog comparator is the binary Read Data signal 132.

A radial position error signal, called a Radial Push-Pull (RPP) signal, is derived by subtracting appropriate pairs of the quad detector signals, for example (A+D)–(B+C). For media with wobbled grooves, the wobble signal is a high frequency modulation of the relatively low frequency RPP signal. In FIG. 1, various electronic filtering and processing delays for the RPP/wobble signal are lumped as Delay 3 (110). If the wobble signal is used for synchronization of a write clock signal, the wobble signal is typically received by a Phase-Locked Loop (PLL, 112). The output of the PLL is used for a Write Clock (114). A Write Data signal (116) is synchronized to edges of the Write Clock (114), as controlled by a latch 118 to generate a Write Intensity signal (120). A Laser Intensity circuit 126 is controlled either by the Write Intensity signal (120) or by a Read Intensity signal, and the Laser Intensity circuit then controls the intensity of a laser diode light source. In FIG. 1, path delays in driving the Laser Intensity circuit, as well as any optical path delays are lumped as Delay 4 (128).

Typically, Delay 1 and Delay 4 are negligible. Delay 2 and Delay 3, however, are significant, and both may vary with time and temperature, and may vary from drive to drive. The relative effects of these delays also varies with the angular velocity of the disc. For example, if a disc is partially written in a drive at 1× angular velocity, and rewritten in a drive at 2× angular velocity, the delays have a different effect for the 2× drive relative to the 1× drive.

Consider the problem of writing a new mark at a precise spatial position relative to a spatial zero-crossing of wobble, or writing a new mark relative to an existing mark. One could detect a zero-crossing in a wobble signal, wait the proper number of Write Clock cycles, and write the beginning of a new mark. Alternatively, one could detect the end of an existing mark using the Read Data signal (108), wait the proper number of Write Clock (114) cycles, and write the beginning of the new mark. Typically, wobble zero-crossings or mark edges would be averaged over many transitions using a phase-locked loop. The proper number of Write Clock cycles may be known for calibrated drives, but may vary over time and may vary from drive to drive. The problem is that if Delay 2 (106), Delay 3 (110), and delay in the PLL 112 are unknown and variable, then there is uncertainty in the time at which a new mark should be written relative to a wobble signal, as sensed in the RPP signal, or relative to an edge of an existing mark, as sensed in the binary Read Data signal. As a result, there is some variation, in the spatial position of the new mark relative to spatial wobble, or the spatial position of the new mark relative to the existing mark, that may be sufficient to cause a data error during reading. If a leading edge of a new mark is to be precisely spatially located relative to a spatial zero-crossing of wobble, or relative to the trailing edge of an existing mark, the system must compensate for Delay 2, and Delay 3, and the delays in the PLL 112 and in the latch 118.

2. Optical Disc Media with Spatial Features

The light received at the surface of the detector array is not uniform, but instead comprises interference patterns, resulting in an intensity distribution. Binary data are encoded as transitions between areas of contrasting reflectance, or by pits and lands that affect the phase (and interference patterns) of the reflected light. Rewriteable optical disc media commonly use a phase change material in a recording layer. During writing, the phase change material becomes crystalline when heated to just below its melting point and then cooled at a relatively slow rate, and amorphous when heated above its melting point and then cooled quickly. Data marks and spaces are formed by using focused laser light to heat small areas of the phase change material to one of two levels, and then allowing the material to cool. Crystalline areas typically reflect more light than amorphous areas. For purposes of illustration, in the following discussion, the data surface in the disc before writing is assumed to be crystalline, data marks are assumed to be amorphous, and crystalline areas are assumed to reflect more light than amorphous areas.

During reading, the focused laser spot on an optical disk typically has a central area of relatively high intensity, and several side lobe rings having a much lower intensity. For media with lands and grooves, the central area of high intensity has an overall diameter sufficiently large such that when the center of the spot is centered on a groove, some light falls onto each adjacent land. The land and groove structure acts as a diffraction grating, and many orders are diffracted from the disc. The size of the pupil of the objective lens, and the track pitch, determine how many orders are reflected from the disc, and how many orders interfere with the 0th diffracted order (the central spot). Amorphous areas reflect less light than crystalline areas, but the analog Read Data signal is also affected by interference patterns. Because of the interference patterns, increasing the width of the groove may result in an increase in overall intensity at the sensor, or may result in a decrease in intensity at the sensor, depending on factors such as the depth of the groove relative to the lands, track pitch, and so forth. Depending on the groove depth and track pitch, notches, at the depth of the grooves, into the lands, may affect the interference patterns such that the analog Read Data signal level is reduced, or increased. Similarly, depending on the groove depth and track pitch, protrusions, at the height of the lands, into the groove, may affect the interference patterns such that the analog Read Data signal level is reduced, or increased. Similarly, bumps or pits that change the depth of the groove relative to the lands may change the interference pattern so as to increase, or decrease, the analog Read Data signal level. In the following discussion, notches into the lands are used to illustrate an example of spatial features that affect the analog Read Data signal, but, in general, protrusions into the groove, or bumps, or pits, may also be used. In the following discussion, it is assumed that increasing the width of the groove, for example by placing notches into the lands, change the interference pattern such that the analog Read Data signal level is increased. Accordingly, notches in the lands are assumed to increase the analog Read Data signal when reading an amorphous area (low reflectivity).

Figure 2:
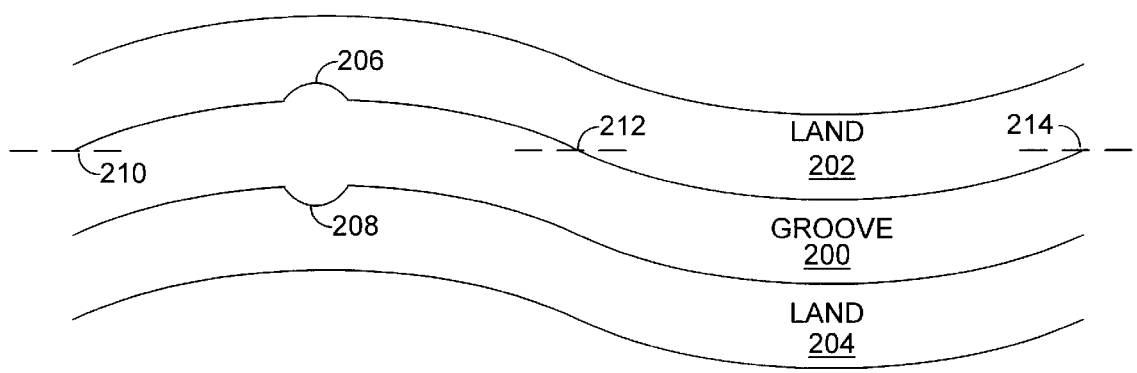
FIG. 2 is a plan view of a disc, illustrating a spatial feature in a wobbled groove, in accordance with the invention.

FIG. 2 illustrates an expanded portion of an example embodiment of an optical disc in accordance with the invention, with a radially symmetrical wobbled groove 200 between two lands 202 and 204. The wobble in FIG. 2 is exaggerated to facilitate illustration. Groove 200 has two spatial features (width modulations) 206 and 208. The groove wobble has spatial zero-crossings at references 210, 212, and 214. Recall from the discussion of FIG. 1 that the radial tracking error signal (RPP) is a differential signal. If the spatial features 206 and 208 are radially symmetrical, the changes to the interference pattern are radially symmetrical, and the differential RPP signal, (A+B)−(C+D), is not affected by the spatial features. However, as discussed above, increasing the groove width, for example notches into the lands as illustrated in FIG. 2, causes the overall intensity at the sensor to increase.

Drives implementing the invention can determine when a transition between a mark and a space is positioned near a spatial feature. This information may be used to verify that the spatial position of a mark or space is within a specified tolerance relative to a zero-crossing of a spatial wobble. Alternatively, the information may be used to calibrate the write channel so that marks and spaces can be written within a specified spatial tolerance. By varying the write time for a mark, a range of write times can be determined for which the end of the mark is not near a spatial feature. This range of times can be used to determine a write time that results in a mark or space being precisely spatially centered relative to a spatial feature, and that information may be used to compensate for various signal delays in order to write a mark or space at a precise spatial location. In particular, the invention is not limited to discs having wobbled grooves, but instead is applicable in general to placing marks or spaces relative to a spatial feature.

To facilitate illustration, in the following discussion, wobbled grooves are used as an example of a way to synchronize the Write Clock. In particular, wobbled lands and grooves are part of several DVD standards. However, the invention is not limited to wobbled grooves. The data for the Write Clock may, for example, come from dedicated clock tracks, may come from another layer of the disc, or may come from sources other than wobble. Some media do not use grooves. The spatial features may be radially asymmetrical. For example a spatial feature may be on only one side of a groove. However, if wobble is used for the reference for the Write Clock, then preferably the spatial features are radially symmetrical to avoid distortion of the wobble signal.

In the following discussion, one specific standard DVD data format is used for illustration. However, there are multiple alternative proposed DVD data formats, and the invention is applicable to many alternative optical disc data formats. Information is typically encoded on a disc by using a run-length-limited modulation code. Such a code allows marks, and spaces between marks, to have several possible spatial lengths. All permitted spatial lengths are commonly expressed in terms of multiples of a length referred to as a channel bit. As the disc rotates relative to the optical transducer, spatial frequencies on the disc are translated into temporal frequencies in various signals from the optical transducer. It is common for one temporal cycle of the Write Clock to correspond to the time required for a distance on the disc of one channel bit to rotate past the optical transducer. In particular, in the time domain, one cycle of the Write Clock is commonly referred to as "T", and the time of the various marks and spaces are described in multiples of "T". In the specific example DVD format, the groove is radially symmetrically wobbled with a wobble period of 32 channel bits. That is, the Write Clock frequency is 32 times the wobble signal frequency.

For one common DVD standard, a channel bit has a length of 0.133 micrometers. The shortest mark or space is 3 channel bits long (0.400 micrometers), and the longest mark or space is 14 channel bits long (1.866 micrometers).

In the example DVD format, data is encoded using marks and spaces that are 11 channel bits long or shorter, and the longest (14 channel bits) mark or space is used only in a "Sync Code". The longest (14 channel bits) marks and spaces occur regularly every 1,488 channel bits, and only at that regular interval. Every longest mark or space is followed by a shortest (3 channel bits) mark or space. In the example DVD format, data is formatted into blocks having error correction, called ECC blocks, but Sync Codes occur outside the ECC blocks.

FIG. 3A illustrates a longest mark 300 and a shortest mark 302 in a wobbled groove, where the mark 300 is 14 channel bits long and the spatial period of the wobble is 32 channel bits. Recall from the discussion above that as the disc rotates, spatial frequencies on the disc are translated into temporal frequencies in various signals from the optical transducer. Accordingly, FIG. 3B illustrates a temporal analog Read Data signal 304, and FIG. 3C illustrates a binary Read Data signal 306, resulting from the marks and spaces illustrated in FIG. 3A. To facilitate illustration, no signal delay is illustrated in FIGS. 3B and 3C. Note that the analog Read Data signal 304 decreases in amplitude when the amorphous mark area passes under the objective lens, resulting in a decrease in reflected light from the data layer, and further resulting in a decrease in the overall intensity of the light propagating to the sensor.

Figure 4A:
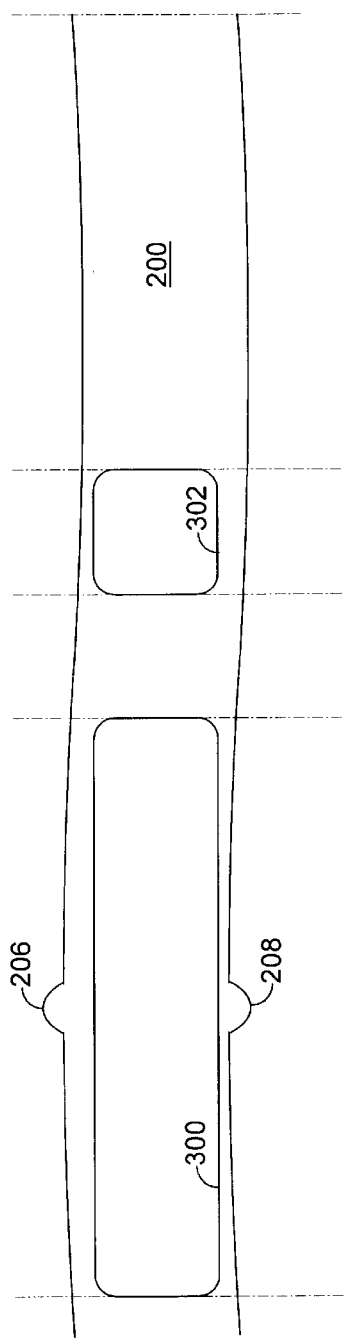
FIG. 4A is a plan view of a disc, with a spatial feature as illustrated in FIG. 2 and further illustrating a data mark centered on the spatial feature.
Figure 4B:
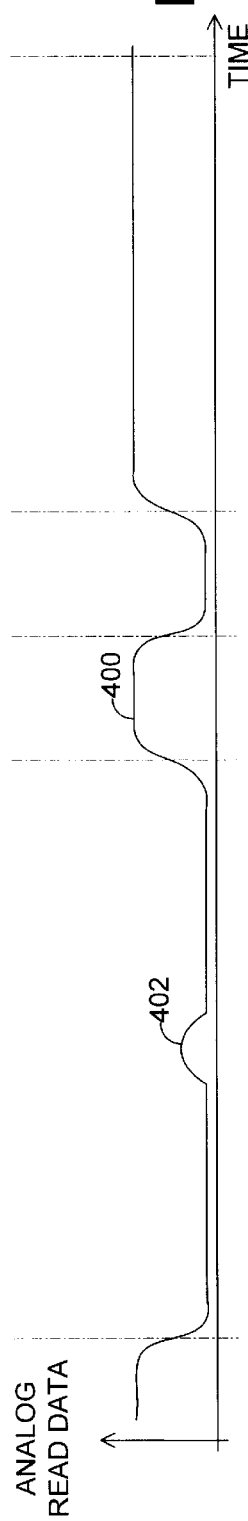
FIG. 4B is a waveform of an analog data signal resulting from the mark illustrated in FIG. 4A.
Figure 4C:
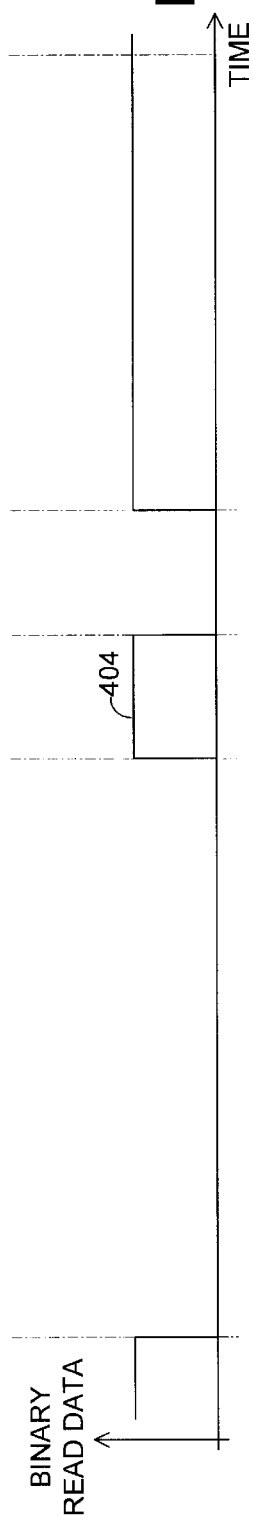
FIG. 4C is a waveform of a binary data signal resulting from the mark illustrated in FIG. 4A.

FIG. 4A illustrates a longest mark 300 and a shortest mark 302 in a wobbled groove, with spatial features 206 and 208 in the groove walls. In FIG. 4A, the longest mark 300 is centered lengthwise relative to the spatial features. FIG. 4B illustrates the temporal analog Read Data signal 400 resulting from the marks and spaces and spatial features illustrated in FIG. 4A. To facilitate illustration, no signal delay is illustrated in FIG. 4B. Waveform 400 has a bump 402 corresponding to the spatial features 206 and 208. The spatial features are designed so that when a transition between a mark and a space is not close to the spatial features, the resulting bump in the analog Read Data signal does not exceed the reference voltage to the comparator (FIG. 1, 130), so that the resulting binary Read Data signal (FIG. 1, 132) is not affected. This is illustrated in FIG. 4C, where the resulting binary Read Data signal 404 is not affected by the spatial features 206 and 208.

Figure 5A:
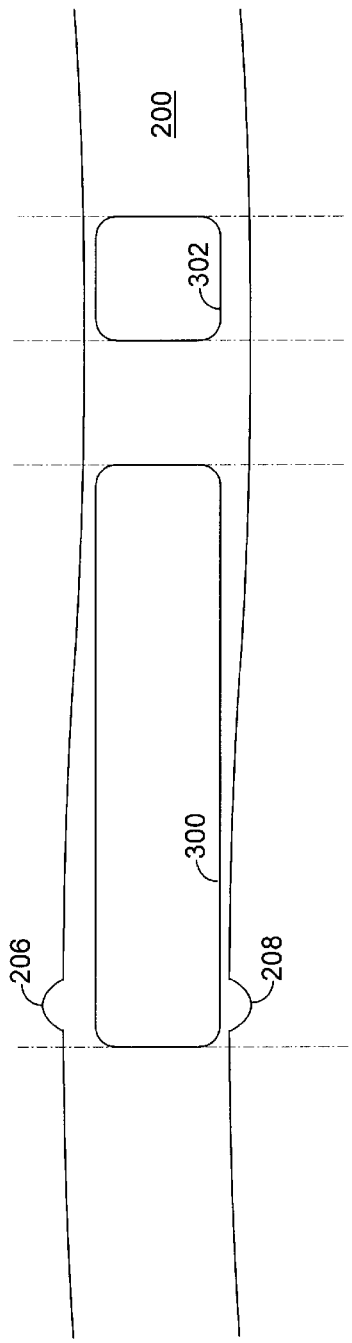
FIG. 5A is a plan view of a disc, with a spatial feature as illustrated in FIG. 2, and further illustrating a data mark having a transition near the spatial feature.
Figure 5B:
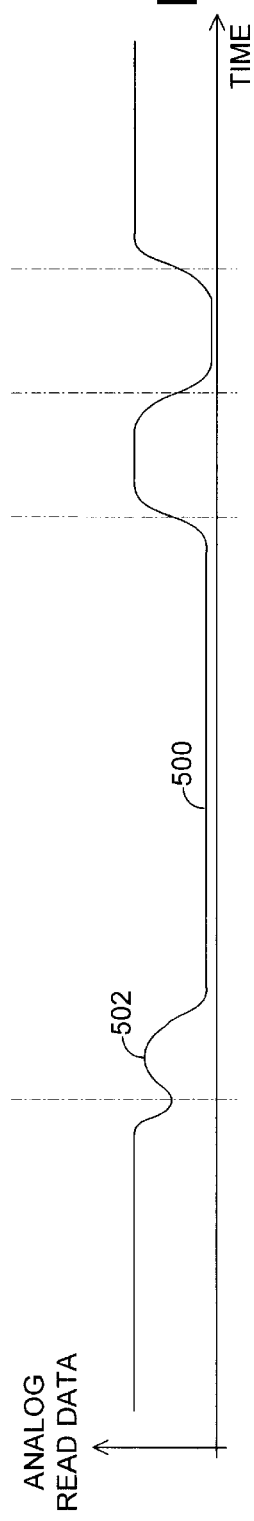
FIG. 5B is a waveform of an analog data signal resulting from the mark illustrated in FIG. 5A.
Figure 5C:
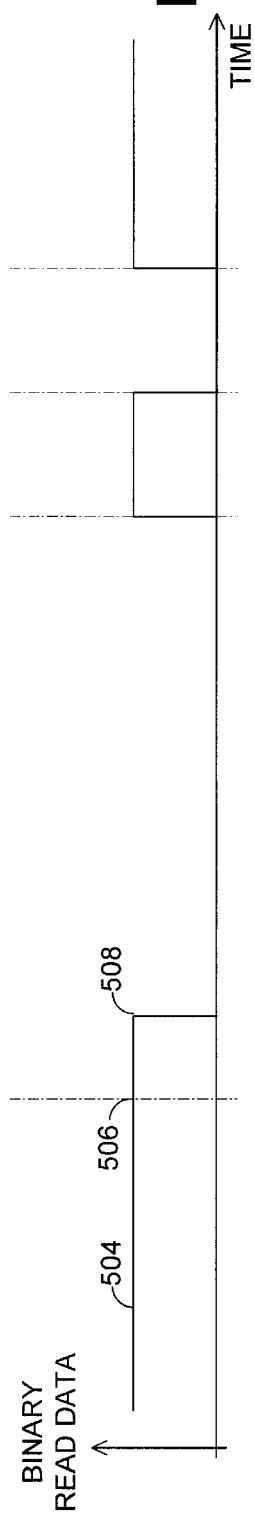
FIG. 5C is a waveform of a binary data signal resulting from the mark illustrated in FIG. 5A.

FIG. 5A illustrates a longest mark 300 and shortest mark 302, with a transition, between a space and the longest mark, near the spatial features 206 and 208. FIG. 5B illustrates the temporal analog Read Data signal 500 resulting from the marks and spaces and spatial features illustrated in FIG. 5A. To facilitate illustration, no signal delay is illustrated in FIG. 5B. In FIG. 5B, at reference 502, just as the analog Read Data signal starts to fall in response to the transition to the data mark 300, the spatial features cause a rise in the signal. As a result, the point at which the analog Read Data signal drops below the reference voltage for the comparator (FIG. 1, 300) is substantially delayed. This is illustrated in FIG. 5C, where the binary Read Data signal 504 should have a falling edge at the time indicated by reference 506, but instead the falling edge is delayed until the time indicated by reference 508. Alternatively, the analog Read Data signal may temporarily fall below the reference voltage, then exceed the reference voltage during the bump, and then fall below the reference voltage again. In either case, when the binary Read Data signal is processed, the timing of at least one transition in the binary Read Data signal, and the duration of at least one mark or space as seen in the binary Read Data signal, are incorrect, and a read error will occur.

As discussed above, for other media designs, it may be appropriate for the spatial features to protrude into the groove, making the groove more narrow instead of wider. In general, data may be recorded on the lands and in the grooves, or the media may not use lands and grooves, or marks may be more reflective than spaces, or marks may be changes in height of the recording surface (pits or bumps). The spatial features may have straight sides instead of curved sides. Alternatively, the spatial features may be changes in the height of the data recording surface (pits or bumps), or anything else that affects the total intensity of light at a photo detector. The primary requirement is that the spatial features must affect the timing of a transition of the binary Read Data signal if a transition between a mark and a space is near the spatial feature, but must not be detectable in the binary Read Data signal if a transition between a mark and a space is not near a spatial feature. Preferably, the spatial features have little effect on the RPP signal, and little effect on the signals from adjacent tracks. Accordingly, in general, marks, or spaces, or both, may be used for verification and calibration.

Figure 6:
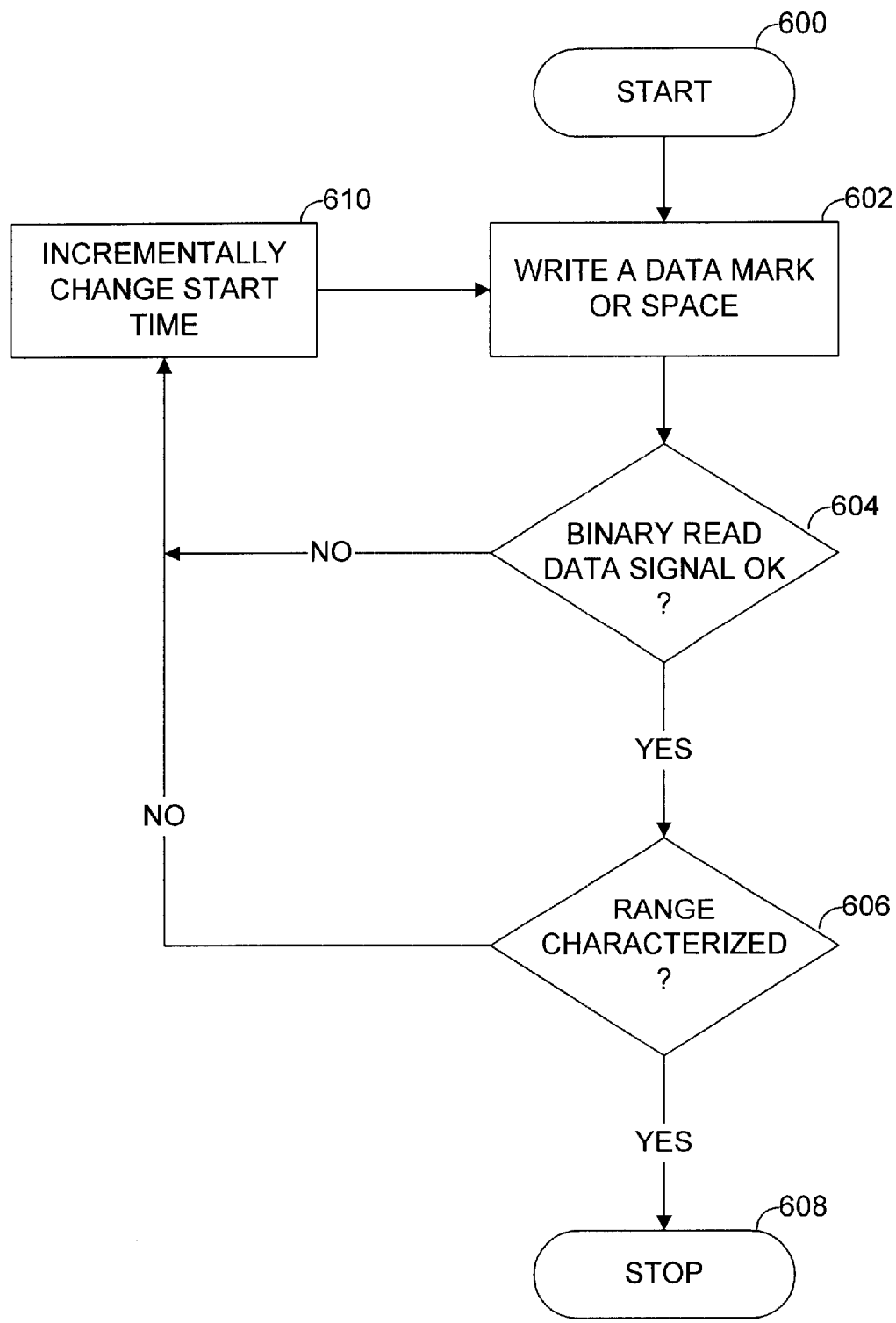
FIG. 6 is a flow chart of a first example method for calibration of accurate spatial placement of marks and spaces in accordance with the invention.

FIG. 6 illustrates one example calibration method in accordance with the invention. Data marks (or spaces) are written near spatial features (step 602). There may be many spatial features so that averaging may be used to reduce noise. For each mark (or space), the binary Read Data signal resulting from the mark (or space) is evaluated (step 604). Evaluation may comprise observing whether or not the mark (or space) results in a read error. Alternatively, evaluation may comprise measuring the time duration of the mark (or space) as detected in the binary Read Data signal. Marks (or spaces) are repeatedly written or rewritten, while adjusting the timing of the Write Data signal (step 610), until a range of write start times is determined, for which the binary Read Data signal is not affected. The method may, for example, determine a write time at which the time can be shifted ±5T without causing read errors. Alternatively, the method may determine a range of Write Data transition times for which the binary Data Signal is not affected, bounded by Write Data transition times where the binary Read Data signal is affected. A time halfway between the times that result in a distorted binary Read Data signal, results in a mark or space that is centered on the spatial features.

In FIGS. 4A and 5A, only longest (14T) marks were illustrated near spatial features. The longest marks and spaces are particularly convenient, first because their length enables a calibration scheme that can compute offsets on the order of ±5T, second because the longest marks and spaces occur at regular positions within the data, and third because the longest marks and spaces occur outside ECC blocks (within Sync Codes). In general, however, marks and spaces of any length may be used. However, if the optical system cannot resolve a length much shorter than a 3T mark or space, a spatial feature may need to be on the order of 2T in length to be detectable by the optical system. In a specific embodiment, the spatial features are about 2T in length. Therefore, the marks and spaces used for calibration may need to be longer than 3T. In practice, because of various tolerances, it may be desirable to use longer readily available marks such as 9T or 10T.

Figure 7:
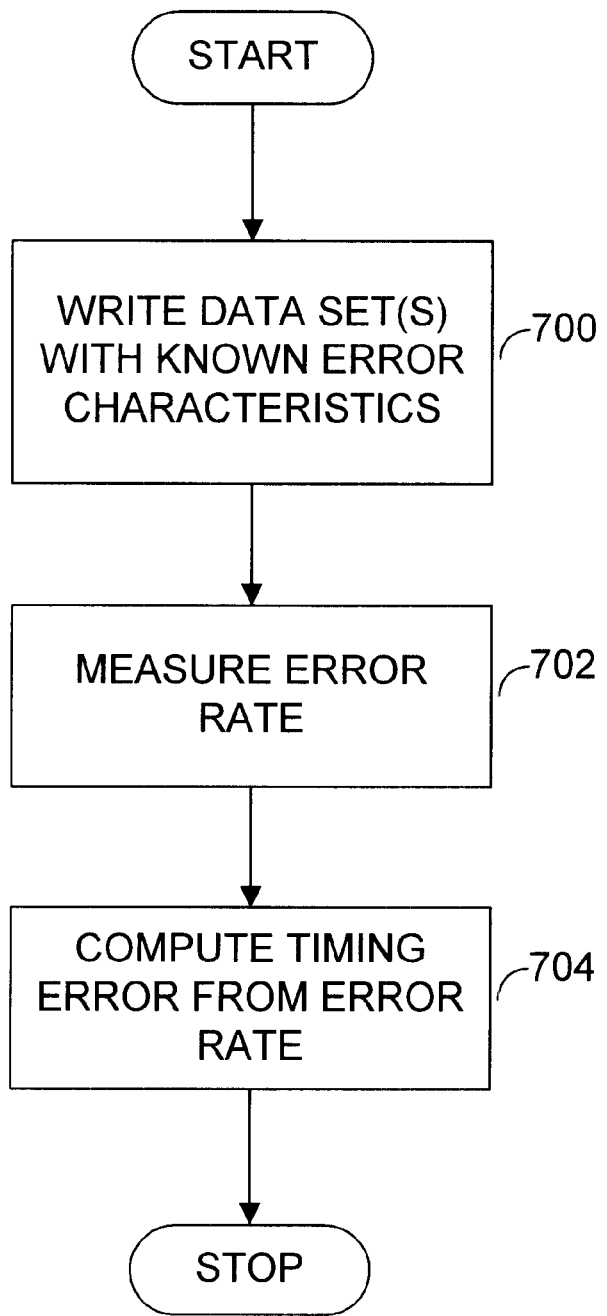
FIG. 7 is a flow chart of a second example method for calibration of accurate spatial placement of marks and spaces in accordance with the invention.

FIG. 7 illustrates a method in which entire data sets are used for calibration, using marks and spaces of variable lengths. A disc may be manufactured with spatial features arranged in accordance with a pre-determined data set. The error rate for the pre-determined data set may be characterized as a function of timing of the Write Data signal, when the data set is written in the area containing the spatial features. For example, if spatial features are arranged for a range of mark and space lengths, when the write timing is off by 2T, errors may start to occur for 9T marks and spaces, and when the write timing is off by 3T, errors may start to occur for 10T marks and spaces, and so forth. Note that although many of the errors may be automatically corrected, the error correction system may report the number of errors corrected. This information may or may not be available outside the drive mechanism, but drives typically have access to the number of errors.

At step 700, the pre-determined data set is written at the location on the disc having spatial features. At step 702, the error rate for the data set is measured. At step 704, the error rate is compared to prior characterization of error rate as a function of timing of the Write Data signal. As a result, the magnitude of the timing error is known, but not the sign. The timing of the Write Data signal may then be adjusted by the magnitude determined at step 704, and the method of FIG. 7 repeated. If the error rate is worse, the timing was adjusted in the wrong direction and the timing adjustment may be reversed.

There are many alternatives for using characterized data sets as generally illustrated in the method of FIG. 7. For example, a set of pre-determined data sets may be defined, with the following characteristics. A first data set may be designed so that a non-zero pre-determined error rate occurs when the write timing is ideal, and error rate may increase when timing is shifted in one direction, and error rate may decrease when timing is shifted in the opposite direction. A second data set may be designed with the opposite characteristics from the first data set, so that error rate increases in the timing offset direction in the opposite direction from the first data set. For example, when the write timing is ideal, the first data set may have a pre-determined number of marks (or spaces) with leading edges aligned with spatial features, and the second data set may have the pre-determined number of marks (or spaces) with trailing edges aligned with spatial features. A third data set may be designed so that an ideal write timing results in zero error rate, and the error rate increases for a timing shift in either direction from the ideal timing. By accumulating the error rate for all three data sets, and repeating the procedure many times, noise is reduced and high accuracy is achieved.

Given a mark or space at a known spatial location, as in FIG. 4A, the delay between a spatial edge of a mark or space and the time at which the edge is detected in the binary Read Data signal (FIG. 1, 132) may be determined. From the calibration procedure, it is known when a transition between a mark and a space must be initiated in the Write Data signal (FIG. 1, 116) in order to place the mark or space at a known spatial location. From FIG. 1, the calibration procedure determines {(Delay 3) plus (delay in the PLL and write circuitry)} and (Delay 2). From these known times, given detection of a zero-crossing in a wobble signal, it is known when a mark or space must be written to ensure a spatial accuracy relative to a spatial zero-crossing in the spatial wobble. Alternatively, from these known times, given detection of edges of existing marks and spaces in the binary Read Data signal, it is known when a new mark or space must be initiated in order to place the new mark or space at an accurate location relative to an existing mark or space. Note in particular that the calibration method may be performed at any angular velocity.

The spatial features for verification and calibration may be confined to a special calibration area of the disc. For example, for rewriteable CD's and DVD's, it is common to dedicate an area (called a Power Calibration Area) at an innermost radius of the disc, for calibration of laser power, specifically for each medium. Each time a new medium is inserted, or each time a drive is powered on with a disc inserted, laser power is calibrated for the specific inserted disc. The Power Calibration Area may also be used for signal delay verification and compensation, with spatial features placed only in the Power Calibration Area. Alternatively, as discussed above, the longest (14 channel bits) mark or space is used only within Sync Codes. The longest (14 channel bits) marks and spaces occur regularly every 1,488 channel bits, and only at that regular interval. Accordingly, spatial features may be placed regularly every 1,488 channel bits. In particular, if spatial features are placed throughout the disc at the location of the longest marks and spaces with the Sync Codes, then spatial accuracy of writing can be verified periodically as a read-after-write process.

3. Data Format

The following details provide just one representative example of a data format, to provide a context for a subsequent discussion of pre-determined data for copy protection. In particular, the following discussion is based on a format that is part of an ECMA standard, ECMA-267, "120 mm DVD-Read-Only Disk." ECMA-267 is available in printed form from ECMA, 114 Rue du Rhone, CH-1204 Geneva, Switzerland. ECMA-267 is also available electronically at www.ecma.ch. There are many alternative data formats that are equally suitable.

Data is first arranged into a Data Frame, where a Data Frame comprises 12 rows with 172 bytes each. There are 2,048 main data bytes, plus 12 bytes of identification (first row) and 4 bytes of error detection codes (last row). The 2,048 main data bytes are then scrambled, using a feedback shift register. During scrambling, the relative positions of bytes are not altered, but the bit patterns are altered. Sixteen consecutive scrambled Data Frames are arranged into an ECC block. An ECC block has a data array of 192 rows of 172 bytes each. Sixteen rows of column parity are added (16 bytes for each column of 172 bytes). For the resulting 208 rows, 10 bytes of row parity are added. The resulting array has 208 rows of 182 bytes each. Recording Frames are obtained by interleaving one of the 16 rows of column parity after every 12 data rows. Each 8-bit byte of the Recording Frame is then encoded into a 16-bit code word, using a substitution table with multiple states.

The disc includes a lead-in zone, followed by a data zone, followed by a lead-out zone. The lead-in zone includes a Control Data zone. The Control Data zone includes 192 Control Data blocks (each is an ECC block). The first 2,048 bytes of each Control Data block is reserved for physical format information. For the physical format information area of a Control Data block, the first 32 bytes contain information about disc type, structure, recording density, and other essential compatibility information. It is essential that at least a portion of the first 32 bytes be variable to enable a non-protected disc to be identified and read by existing drives, as well as presently undefined future drives.

4. Pre-determined Data (with Corresponding Spatial Features) for Copy Protection In the above discussion, spatial features were used to verify the spatial placement of marks and spaces, or to calibrate a drive to enable accurate placement of marks and spaces. In the following discussion, spatial features are used to prevent arbitrary data from being read with a correctable error rate in areas containing spatial features. Parts of an ECC Control Data block are permitted to have arbitrary data. For areas with spatial features, pre-determined data having longer marks and spaces aligned with the spatial features can be written and read with a correctable error rate, but arbitrary data, such as decryption keys, will cause an uncorrectable read error rate.

Figure 8:
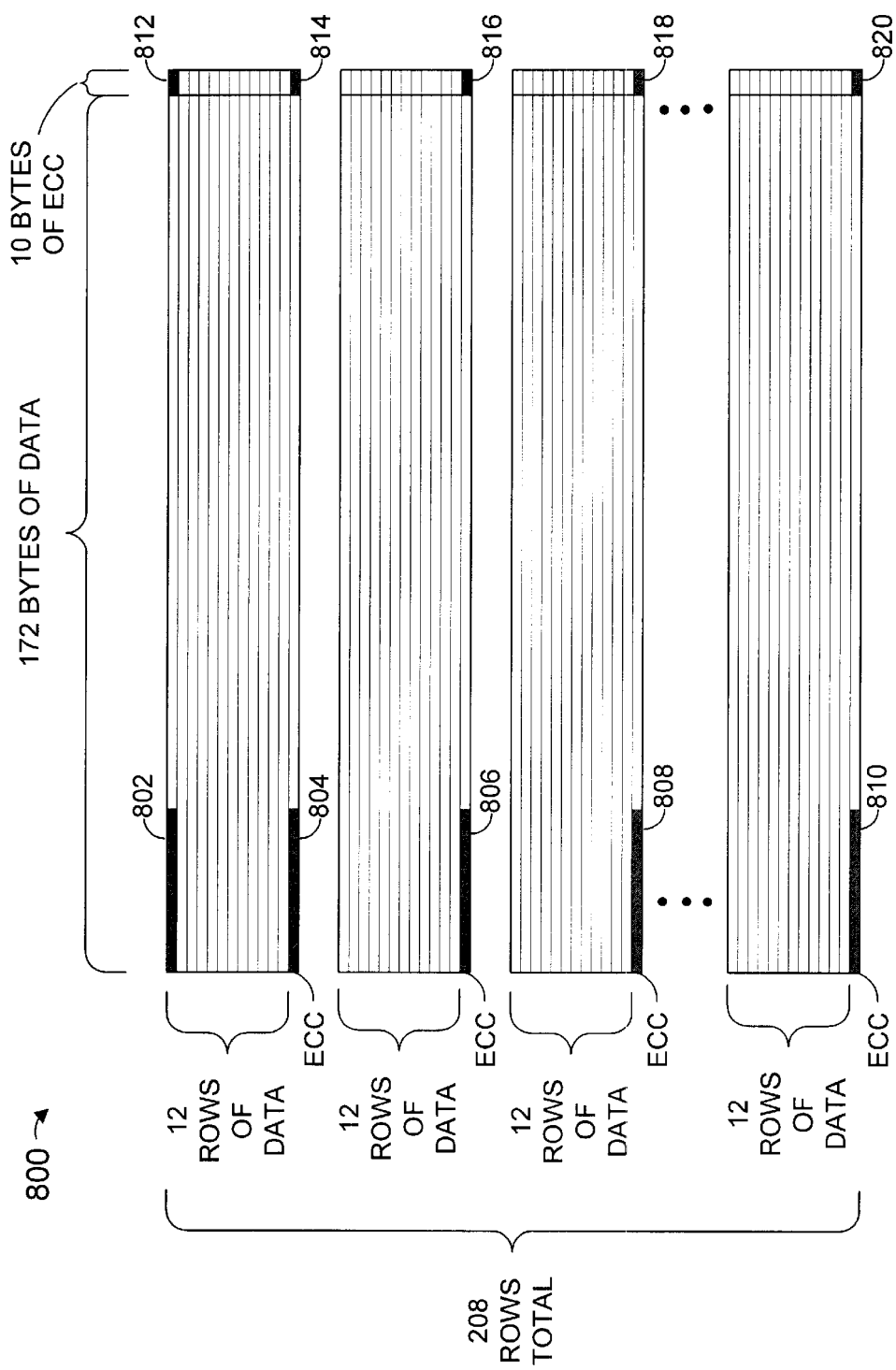
FIG. 8 is block diagram of an ECC block, with one area reserved for arbitrary data.

FIG. 8 illustrates a Control Data ECC block 800, as defined in ECMA-267, before encoding into 16-bit code words. The block 800 contains 16 Recording Frames, where each Recording Frame comprises 12 rows of data and one row of ECC, with 172 bytes of data per row and 10 bytes of ECC per row. Of particular interest to rewriteable DVD, a portion of the first 32 bytes should be permitted to be arbitrary data. In FIG. 8, reference 802 designates the first 32 data bytes. If, for example, the first 32 data bytes are to be arbitrary, then 32 bytes of column ECC (804, 806, 808, and 810) and the 10 bytes of row ECC 812 for the first data row, and the 10 bytes of row ECC (814, 816, 818 and 820) for the ECC rows, all need to be permitted to be arbitrary as well. If only the first 32 data bytes are to be arbitrary, then except for the 714 bytes indicated by reference numbers 802–820, the rest of the block 800 could be pre-determined.

For pre-determined data, the disc may have spatial features positioned so that many longer marks and spaces are written approximately centered on the spatial features. As discussed above, spatial features may be about two channel bits long, and to allow for timing variability, may be restricted to marks and spaces longer than, for example, eight channel bits. Note that the choice of pre-determined data is somewhat arbitrary, as long as there is a sufficient number of longer marks and spaces to enable a large number of spatial features. For example, pre-determined data of all binary zeros (before encoding) will provide a sufficient number of longer marks and spaces in encoded form on the disc. For the pre-determined data, the disc may have a spatial feature aligned with every relatively long mark (or space) in the encoded form of the pre-determined data, as written onto the disc. Then, for every byte other than the 714 arbitrary bytes discussed above, if the unscrambled form of the pre-determined data is sent to the drive for recording, the block 800 may be read with a correctable error rate. However, if a large number of data bytes are pseudo-random, or anything other than the pre-determined values, then many transitions between marks and spaces will be close to spatial features, which will probably overwhelm the error correction system, thus making the block 800 unreadable. Note that there are multiple (192) copies of the Control Data ECC block, so each copy must have a section of pre-determined data and corresponding spatial features. A similar approach may be applied to ECC blocks other than the Control Data ECC blocks to prevent a simple address offset or for other reasons.

In the above discussion, only 714 bytes in an ECC block are arbitrary data, and all the rest of the block is pre-determined. Alternatively, one may want to permit as much of an ECC block to be arbitrary data as possible, minimizing the amount of pre-determined data. With 16 rows of column ECC, and 10 bytes of row ECC, if there are 17 rows of data with errors, and 16 columns of data bytes with errors, with the errors byte-wise aligned, then the error correction system cannot correct the errors. However, arbitrary data written into the area with spatial features may not generate an error in every byte. If only the 12 rows of CSS data contained spatial features, then it would be possible for ECC to recover this data even if it were unreadable, since there is the capability of correcting up to 16 lines of data that is known to be incorrect (i.e. flagged as erasures). Even if the 16 lines of ECC also contained spatial features (i.e. were substantially pre-determined) it would still be possible to generate data in the remaining sectors such that they would produce the required data in the unreadable sector and also produce the pre-determined ECC codes in the 16 ECC lines. To prevent this type of circumvention, it is desirable to have a very high percentage of each block contain spatial features. It is also desirable to have spatial features vertically aligned. This can be readily accomplished by choosing vertically aligned data in the scrambled domain and then generating the corresponding user data by descrambling the chosen data.

Since ECC codes are generated in the scrambled domain, and since the ECC redundancy bytes associated with the all zero data sequence are themselves all zero, and since the zero data byte can be encoded to contain long marks or spaces, this is a particularly good sequence for this technique. That is, sequences of all zeros in the scrambled domain, produce all zero ECC bytes and can be encoded to contain long marks and spaces. Therefore they are particularly suitable for substantially filling data blocks with pre-determined data that is compatible with a large number of spatial features aligned both horizontally and vertically.

In particular, consider the situation for decryption keys, with all of a Control Data ECC block pre-determined, except for about 32 bytes of user data as illustrated in FIG. 8. The area reserved for CSS decryption keys is approximately the same size as one Recording Frame (12 rows of data) in the Control Data ECC block. If 12 rows of pseudo-random decryption data are written, then 16 rows of column ECC codes other than the pre-determined column ECC codes will also be written, and row ECC codes other than the pre-determined row ECC codes will be written for 28 rows. Note that in addition to the 12 rows of CSS decryption keys, if most of the other rows of the block are pre-determined, then one cannot write additional data that would cause pre-determined ECC codes to be generated. Therefore, even though decryption keys may only occupy 12 rows, writing those 12 rows requires 28 rows to be different than the pre-determined data, making it highly likely that the errors in the ECC block will be uncorrectable, and highly likely that the ECC block will therefore be unreadable.

Note that in the above discussion, the emphasis has been on rewriteable media. However, the invention is equally applicable to write-once media. Spatial features may be used within Control Data ECC blocks, and other blocks, for write-once media just as described for rewriteable media. Calibration of spatial position may be performed as discussed above, requiring only that each mark or space for calibration can only be written once.

In summary, use of spatial features with pre-defined data provides a writeable disc medium that physically prevents reading of arbitrary data, with a correctable error rate, written in areas reserved for the pre-defined data, but still allows reading and writing of some arbitrary data. One particularly useful application of the invention provides copy protection, by preventing reading of decryption keys in Control Data ECC blocks, while still enabling compatibility for use as an un-protected disc, by allowing reading and writing of some arbitrary data in Control Data ECC blocks. Once the pre-determined data is defined, every compatible rewriteable disc may be fabricated with an identical pattern of spatial features. The impact on disc cost is insignificant. Since the spatial features do not affect the binary Read Data signal for centered marks and spaces, and since radially symmetrical spatial features do not affect the RPP signal, the resulting discs, after writing, can be read in existing drives. Thus, compatibility with existing drives is preserved without representing a threat of unauthorized copying of stamped discs.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of preventing arbitrary data from being read with a correctable error rate from an optical disc, comprising:

forming spatial features on the optical disc;

locating the spatial features on the optical disc so that when pre-determined data is written, the pre-determined data is aligned with the spatial features and a read error rate is sufficiently low to be correctable, and when data other than the pre-determined data is written, the data other than the pre-determined data is not aligned with the spatial features and a read error rate is too high to be correctable.

2. The method of claim 1, wherein the step of forming spatial features further comprises:

increasing a width of a groove on the optical disc, wherein a distance, tangential to a groove center line, along which the width of the groove is increased, is less than a spatial length of a data mark.

3. The method of claim 1, wherein the step of forming spatial features further comprises:

decreasing a width of a groove on the optical disc, wherein a distance, tangential to a groove center line, along which the width of the groove is decreased, is less than a spatial length of a data mark.

4. The method of claim 1, wherein the step of locating the spatial features further comprises:

locating the spatial features in an area reserved for decryption keys.

5. The method of claim 1, further comprising:

selecting the pre-determined data, so that substantially all bytes, in at least one column of bytes in an error correction block, contain at least some marks and spaces that are substantially longer than the length of the spatial features.

6. The method of claim 1, further comprising:

selecting the pre-determined data to be all binary zeros, before encoding.

7. A method of preventing arbitrary data from being read with correctable error rate from an optical disc, comprising:

forming spatial features on the optical disc, wherein when a transition between a mark and a space is not near one of the spatial features, no read error results when the disc is read by a drive, and wherein when a transition between a mark and a space is near one of the spatial features, a read error results when the disc is read by a drive; and locating the spatial features on the optical disc so that when pre-determined data is written, transitions between marks and spaces are not near the spatial features, and when data other than the pre-determined data is written onto the optical disc, at least some transitions between marks and spaces are near the spatial features.

8. The method of claim 7, wherein the step of forming spatial features further comprises:

increasing a width of a groove on the optical disc, wherein a distance, tangential to a groove center line, along which the width of the groove is increased, is less than a spatial length of a data mark.

9. The method of claim 7, wherein the step of forming spatial features further comprises:

decreasing a width of a groove on the optical disc, wherein a distance, tangential to a groove center line, along which the width of the groove is decreased, is less than a spatial length of a data mark.

10. The method of claim 7, wherein the step of locating the spatial features further comprises:

locating the spatial features in an area reserved for decryption keys.

11. The method of claim 7, further comprising:

selecting the pre-determined data, so that substantially all bytes, in at least one column of bytes in an error correction block, contain at least some marks and spaces that are substantially longer than the length of the spatial features.

12. The method of claim 7, further comprising:

selecting the pre-determined data to be all binary zeros, before encoding.

13. An optical disc comprising:

a spatial feature, the spatial feature located in an area of the optical disc reserved for data for a decryption key;

wherein when a mark is spatially centered relative to the spatial feature, and the mark is read in a compatible disc drive, a resulting binary read data signal is not affected; and wherein when the mark is positioned so that an end of the mark is adjacent to the spatial feature, and the mark is read in a compatible disc drive, a resulting binary read data signal is affected.

14. The optical disc of claim 13, further comprising:

a groove, the mark written in the groove.

15. The optical disc of claim 14, further comprising:

the spatial feature comprising an increase in a radial width of the groove, with a distance, tangential to a groove center line, along which the width of the groove is increased, being less than a spatial length of the mark.

16. The optical disc of claim 14, further comprising:

the spatial feature comprising a decrease in a radial width of the groove, with a distance, tangential to a groove center line, along which the width of the groove is decreased, being less than a spatial length of the mark.

17. An optical disc comprising:

a spatial feature, located in an area of the disc reserved for data for a decryption key;

wherein when a space is spatially centered relative to the spatial feature, and the space is read in a compatible disc drive, a resulting binary read data signal is not affected; and wherein when the space is positioned so that an end of the space is adjacent to the spatial feature, and the space is read in a compatible disc drive, a resulting binary read data signal is affected.

18. The optical disc of claim 17, further comprising:
a groove, the space written in the groove.

19. The optical disc of claim 18, further comprising:
the spatial feature comprising an increase in a radial width of the groove, with a distance, tangential to a groove center line, along which the width of the groove is increased, being less than a spatial length of the space.

20. The optical disc of claim 18, further comprising:
the spatial feature comprising a decrease in a radial width of the groove, with a distance, tangential to a groove center line, along which the width of the groove is decreased, being less than a spatial length of the space.

* * * * *